United States Patent [19]

Syarto et al.

[11] 4,364,696

[45] Dec. 21, 1982

[54] EDGE FINISHING MACHINE

[76] Inventors: Louis W. Syarto, 184 Highland Rd., Fairfield, Conn. 06430; Sanford S. Zimmerman, 40 Easton Rd., Westport, Conn. 06880

[21] Appl. No.: 13,077

[22] Filed: Feb. 21, 1979

[51] Int. Cl.³ .............................. B23C 3/12; B27C 5/06
[52] U.S. Cl. ...................................... 409/138; 51/110; 144/245 A; 409/145
[58] Field of Search ....................... 51/76 R, 110, 116; 144/162 A, 187, 245 A, 253 J, 85, 249 B; 198/627; 409/138, 145, 154, 161, 169, 173, 205

[56] References Cited

U.S. PATENT DOCUMENTS

| Re. 29,097 | 1/1977 | Bando | 51/110 |
| 1,097,012 | 5/1914 | Eldridge | 198/627 X |
| 1,660,350 | 2/1928 | Owen | 51/76 R X |
| 1,850,432 | 3/1932 | Weber | 51/76 R |
| 2,356,324 | 8/1944 | Kendle et al. | 144/249 B |
| 3,231,063 | 1/1966 | Talbot | 198/627 X |

FOREIGN PATENT DOCUMENTS

| 21571 | 4/1930 | Netherlands | 144/86 |
| 750732 | 6/1956 | United Kingdom . | |
| 840066 | 7/1960 | United Kingdom . | |
| 1407164 | 9/1975 | United Kingdom . | |
| 1409516 | 10/1975 | United Kingdom . | |
| 1480667 | 7/1977 | United Kingdom . | |
| 1486498 | 9/1977 | United Kingdom . | |
| 1489044 | 10/1977 | United Kingdom . | |
| 1534121 | 11/1978 | United Kingdom . | |

*Primary Examiner*—Z. R. Bilinsky
*Attorney, Agent, or Firm*—Martin D. Wittstein

[57] ABSTRACT

A material working machine for edge finishing of workpieces of different sizes and shapes and of different materials has a material work station supported by a table like construction with a mechanical cutting tool mounted at the work station. The machine includes a workpiece feeding assembly comprised of a pair of resilient juxtaposed feeding belts having opposed gripping surfaces adapted to grip the opposite faces or sides of a workpiece to feed the workpiece across the working station as the resilient belts are moved. An adjustable pressure plate is mounted behind the feeding surface of each belt and can be moved toward or away from the opposite belt so as to be able to adjust the pressure exerted by the belts on the workpiece and also to accommodate workpieces of varying thickness.

3 Claims, 6 Drawing Figures

EDGE FINISHING MACHINE

BACKGROUND OF THE INVENTION

The present invention finds utility in the field of material working machines which perform edge finishing operations on small or large sheets or continuous extrusions of various materials. Although the present invention was designed and developed to fill a need for a machine to do edge finishing on sheets of clear plastic such as LUCITE, it should be understood at the outset that the machine hereinafter disclosed and claimed is adaptable to edge finishing of sheets or exyrusions of almost any material capable of taking these shapes and of being finished, e.g., metal, wood, synthetic or composition wood products and all manner of plastic materials.

Edge finishing of sheet material has always been a difficult operation to carry out due largely, among other things, to the inherently troublesome problems of feeding the piece of material being worked upon across, over, under, or along, as the case may be, the tool which is performing the edge finishing operation. The same observation is true with regard to continuous extrusions, but the extent of the problem is not as great with extrusions as with sheets, especially relatively large sheets. Also, it should be understood that the problems sought to be solved by the present invention are those connected with material feeding for an edge finishing operation, where the quality of appearance or texture of the finished edge is of extreme importance, as distinguished from shaping, planing, routing or other edge working operations which produce or alter a basic design, contour or shape but in which the quality of appearance or texture of the machined surface is of little or no significance. These distinctions will be more apparent as this disclosure proceeds.

Referring more specifically to the problems encountered in feeding a piece of material during an edge finishing operation, it will at once be recognized by those skilled in the art that it is absolutely essential to reduce vibration of the workpiece to an absolute minimum, since vibration of the workpiece is a very significant cause of unsatisfactory edge finishing from the standpoint of the quality of appearance or texture of the finished workpiece edge. Even a minute amount of vibration can result in the surface of the edge being finished having scratches of blemishes of sufficient magnitude to render the finished edge unacceptable. Of course, vibration in the working tool would produce equally unsatisfactory results, but the present invention is not concerned with vibration in the working tool and it is assumed that such vibration is eliminated by suitable mounting of the tool and supporting components.

It is also necessary, in an edge finishing operation, to feed the workpiece at a uniform velocity as the workpiece passes by the working tool from one end of the workpiece to the other. The reason for this is that any variation in the velocity of movement of the workpiece during the finishing operation can, and very often will, result in a scratch or blemish at a specific location along the edge, or in an altogether different finished appearance or texture between different portions of the edge depending on where and for what duration a change in the velocity of the workpiece occurred. In either of these events, the quality of the finished edge would be unacceptable.

Still further, it is necessary to maintain a uniform amount of contact pressure between the edge of the workpiece being finished and the working tool in order to avoid marring the surface at different locations or imparting to the surface a slight but noticeably different texture or appearance depending upon the amount of variation of the contact pressure. Ordinarily, merely the weight of the piece of material being finished would provide the contact pressure necessary for the finishing operation; the critical factor is that while a piece of material is passing through the machine and being edge finished, the contact pressure should not vary from one end of the edge being finished to the other.

Another serious problem encountered in feeding pieces of material through an edge finishing machine is that of doing so without in any way marring, scratching, nicking, denting, or otherwise damaging any other surface or edge of the piece of material being finished. It should be remembered that ordinarily when material is being edge finished, it is otherwise in a state of completed form or fabrication and that further work will not be performed on the material prior to it being utilized for its intended purpose, either as a finished article of manufacture or as raw material for the manufacture of other articles. In either event, it may be highly desirable, if not absolutely essential, to feed the piece of material through the working machine in such a manner that other surfaces of the workpiece are not damaged.

Although the previous discussion of the most serious problems encountered in edge finishing have been considered in connection with a finishing operation which involves a rotating cutting tool of one type or another, these same problems are, for the most part, present in edge finishing operations which involve other types of working tools such as a sanding belt, an emery wheel or even a flame for edge finishing of plastic sheets by partial melting. It can readily be seen that the problems discussed above can cause at least similar if not much the same type of edge damage if they are allowed to occur during finishing operations involving rotating sanding belts for smooth finishing of wood or synthetic wood materials, emery wheels for bright finishing of metal sheets or flame for smooth polishing of thermoplastic sheets. As will be seen more fully hereinafter, the present invention is applicable to all of these types of finishing operations.

Prior art machines have offered little in the way of improvements in feeding devices for material working machines which perform edge finishing operations. Historically, material was fed by hand through such machines because no automatic feeders were available which could feed the material being finished with as much care as the machine operator, and this is true today in some types of finishing operations, particularly those involving either small parts or those involving clear plastic materials.

One rather popular type of feeding device for edge finishing machines comprises a plurality of closely spaced rollers which are synchronously driven and which are mounted on horizontal axes which are disposed at an angle to a longitudinal fence or guide which defines a path of movement for a workpiece, the rollers urging the workpiece toward the fence as it rides over the rollers. A cutting tool is mounted for rotation about a vertical axis in justaposition with the fence so that an edge of the workpiece contacts the peripheral surface of the cutting tool. There are several disadvantages to this type of feeding arrangement. One is the obvious limitation on the minimum size workpiece which can be handled by the spaced rollers and still have the workpiece move smoothly. A second is the obvious vibration which will be imparted to a workpiece passing from roller to roller, even when the workpiece spans many rollers. Another disadvantage is that the workpiece is sliding relative to the roller surfaces due to the angular mounting thereof with respect to the fance, which causes scratching and marring of smooth sheet surfaces, in some instances even through protective paper coatings applied to these surfaces. A further disadvantage is the relatively high degree of friction between the edge being finished and the fence due to the angular mounting of the rollers, which is detrimental to smooth feeding of large workpieces.

Many material working machines have clamp or vice type intermittent feeders which typically are attachments to the machine and in which the workpiece is gripped by a movable clamp and moved for a predetermined distance, after which the movable clamp releases the work and returns to its starting position while the workpiece is held by a stationary clamp. It is immediately apparent that this type of feeding device can cause considerable surface damage to finished surfaces, and does not lend itself to uniform and uninterrupted feeding of long lengths of material.

The well known ball spline feeder is also a popular feeding assembly, particularly in metal finishing machines. While it is a high-precision feeder well suited for its intended purpose, it is limited in its application to relatively small parts since the stroke of the feeding device is limited by the length of the screw.

It is also known to construct material conveying devices in which one or more pairs of opposed rollers or belts convey material from one location to another by gripping the material between the opposed rollers or belts. Such conveyors may be found in conjunction with extrusion presses, container filling machines, article handling machines, etc., where material is conveyed from one work station to another. Prior to the present invention, however, devices of this type have not been used in conjunction with material edge finishing machines.

BRIEF SUMMARY OF THE INVENTION

The present invention relates generally to the field of material working machines and more particularly to material working machines which are designed for edge finishing of various types of materials.

The present invention at least obviates if not substantially eliminates the problems discussed above, and does so in a manner which is superior to any solution heretofore known, whether or not the solution is among those mentioned hereinabove. As will be seen more fully as the description proceeds, the material feeding assembly, in combination with the material working component, provide a machine in which sheet material can be edge finished without any troublesome vibration, vibration in feeding velocity or contact pressure, and through which machine extrusions of indefinite length can be fed under similarly reliable conditions, thereby achieving the maximum in edge finishing quality that is capable with the finishing tools being utilized.

The machine of the present invention comprises generally a work table having a flat work surface over which the workpiece is adapted to be fed, the table having an aperture therein which defines a work station in the path of movement of the workpiece. A working tool of one type or another is disposed in the aperture and positioned therein in appropriate relation to the bottom edge of the workpiece so as to perform a working operation on the bottom edge of the workpiece as the latter passes over the aperture, the working tool being supported and operated from beneath the work table. A feeding assembly is mounted on top of the work table for feeding a workpiece across the work station with the lower edge of the workpiece is operative association with the working tool, the feeding assembly comprising a pair of opposed resilient gripping elements for forcibly pressing against a portion of the opposite surfaces of the workpiece with sufficient pressure to hold the workpiece in feeding relationship, the gripping elements being mounted for movement along a predetermined path of movement at least a portion of which traverses the work station defined by the aperture. A suitable drive means is provided for moving the gripping elements at a uniform velocity and in synchronism with each other.

In a presently preferred embodiment of the invention, and thereby in some of its more limited aspects, the working tool is a rotary cutter having cutting blades disposed on one longitudinal end face of the cutter rather than around the periphery of the body of the cutter as is customary, with the cutter being mounted with its longitudinal axis arranged vertically so that the bottom edge of the workpiece contacts the cutting face of the cutting tool. A principal advantage of this arrangement is that any minute imperfections in the cutting blades will have no adverse effect upon the quality of the finished surface because every bit of blade surface contacts the entire surface area of the edge being finished, which is not the case with a conventional cutter. Thus, any imperfections caused by a defective blade are corrected or eliminated by other portions of the blade or by other blades contacting the same spot as the cutter rotates at a high rate of speed. As previously indicated, the working tool can also be a sanding disk, an emery wheel for polishing metal, or a flame for partial melting or softening of thermoplastic resin materials.

The resilient gripping elements are preferably in the form of relatively thick rubber endless belts which are disposed in face to face relationship and which pass around pulleys or rollers so as to define the aforementioned path of travel, thereby assuring that material such as clear sheets of plastic can be fed without any possibility of scratching the broad surfaces thereof. A tensioning or pressing assembly is mounted between the opposed runs of each belt in the vicinity of the work station so that the workpiece gripping portions of the belts can be set closer together or farther apart as the case may be to accommodate workpieces of various thickness and also to provide for adjustment of the force with which these portions of the belts grip the workpiece. In order to achieve uniform velocity of movement of the workpiece, the belts are ribbed in the manner of timing belts and are driven by grooved rollers. In order to avoid the tensioning or pressing devices from so changing the length of the belts as to misalign the ribs on the belts with the grooves on the rollers, each pressing device is constructed and arranged to move the opposite or non-gripping run of each belt in the same direction and by the same amount as the gripping run is moved so that the overall length of each belt remains the same regardless of the spacing between the gripping portions of each belt.

Having briefly described the general nature and some of the specific aspects of the present invention, it is a principal object thereof to provide a material working machine for edge finishing of various materials which is superior in efficiency, ease of operation and produces finished edges of higher quality than edge finishing machines heretofore known.

It is another object of the present invention to provide a material working machine for edge finishing of various materials in which workpieces are fed across a working station free of vibration, at a uniform velocity and with a constant contact pressure between the workpiece and a working tool.

It is still another object of the present invention to provide a material working machine for edge finishing of various materials in which a workpiece feeding assembly can feed workpieces of varying thickness and size with the same degree of vibration free uniformity of speed and contact pressure.

It is yet another object of the present invention to provide a material working machine for edge finishing of various materials in which a workpiece feeding assembly is provided which will feed material in a positive and uniform manner without any possibility of the feeding mechanism scratching or marring the surface of the material or in any other way damaging other surfaces thereof.

It is still a further object of the present invention to provide a material working machine for edge finishing of various materials which is capable of performing many different types of finishing operations and be able to accommodate many different types of working tools without changing the mode of operation of the machine.

It is yet another object of the present invention to provide a material working machine for edge finishing of various materials in which the workpiece is moved over a work station in which a rotating cutter or the equivalent thereof contacts the workpiece on the end face of the cutter so that any marks left on the workpiece by imperfections in one portion of the cutter are eliminated by other portions of the cutter.

These and other objects and advantages of the present invention will become more apparent from an understanding of the following detailed description of presently preferred embodiments of the invention when considered in conjunction with the accompanying drawings in which:

DETAILED DESCRIPTION OF PREFERRED EMBODIMENTS

Figure 1:
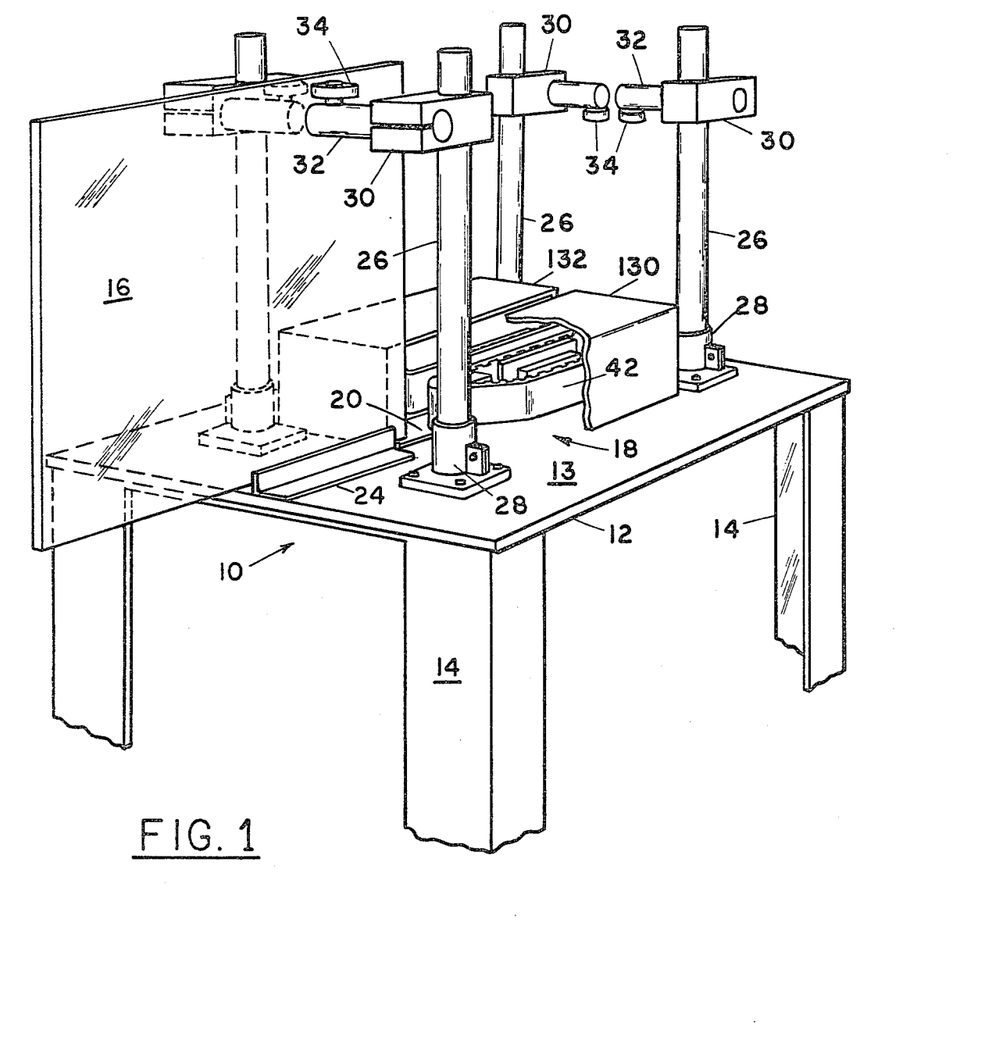
FIG. 1 is a perspective view of the machine of the present invention showing a relatively large sheet of clear plastic material in position to be gripped by the feeding assembly.

Referring now to the drawings, and particularly to FIG. 1 thereof, there is seen an edge cutting machine generally designated by the numeral 10 which comprises a support means in the form of a horizontal work table 12 having a work surface 13 and which in turn is supported at a convenient height by suitable legs 14. All of the operating parts and components of the machine 10 are mounted either on or under the work table 12. The machine is shown in FIG. 1 with a workpiece 16, a relatively large sheet of clear plastic material as an example, in the position it would occupy as it is being manually fed into the machine, just prior to the workpiece being gripped by the feeding assembly, generally designated by the reference numeral 18.

In order to provide a smooth support for the workpiece, a bar 20 is secured to the upper surface 13 of the work table 12 and extends the length thereof except for an opening therein or a discontinuance thereof, as indicated by the reference numeral 22 in FIG. 2, which opening of discontinuance defines a work station and provides access by a cutting tool hereinafter described to the lower edge of the workpiece 16. The upper surface of the bar 20 is preferably highly polished to present a substantially frictionless surface to facilitate free movement of the workpiece 16 along the bar and to prevent the bar from scratching or marring the finished surface of the workpiece.

A short piece of angle stock 24 is also secured to the upper end 13 of the work table 12 and extends from one edge thereof toward the feeding mechanism 18 and is located immediately adjacent to the bar 20. The purpose of the angle stock 24 is to provide a guide which will assist the operator in properly lining up the workpiece 16 with the feeding assembly 18, particularly when the workpiece is a relatively large sheet such as that shown in FIG. 1.

The machine is provided with a further guiding mechanism which both supports and guides the upper edge of relatively tall pieces of material. As seen in FIG. 1, the workpiece 16 is relatively tall in relation to the dimensions of the feeding mechanism 18, and to prevent the sheet from falling on its side after the operator releases his hold thereon, there is provided an upper edge supporting means in the form of a plurality of upright legs 26 mounted in brackets 28, each leg having a bracked 30 adjustably mounted adjacent the upper end thereof. Each bracket 30 has a short arm 32 adjustably carried therein, and a roller 34 is mounted on each arm 32 adjacent the free end thereof. By means of the complete adjustability of all of the parts, the four rollers 34 can be positioned at any height within a wide range, and they can be spaced apart any distance within a wide range to accommodate workpieces of widely varying thickness. Although not shown, it is also possible to have a roller mounted on an arm in such a way as to bear on the upper surface of a workpiece, particularly one which is much lower than the workpiece illustrated, in order to prevent any possibility of the workpiece not maintaining proper contact pressure with the cutting tool as hereinafter fully explained.

Figure 3:
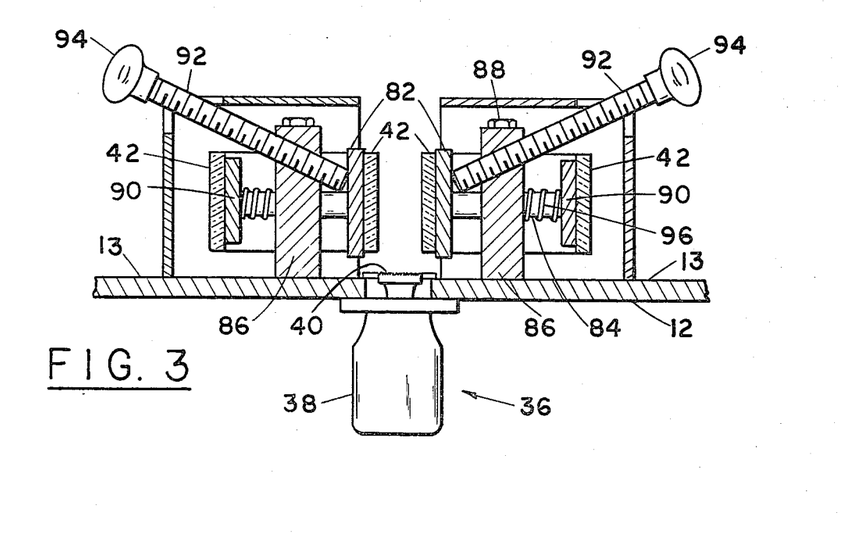
FIG. 3 is a section view taken on the line 3—3 of FIG. 2 and showing details of the pressure assembly.

The machine 10 is provided with an edge working means generally designated by the numeral 36 in FIG. 3. As mentioned hereinabove, there are a number of ways of edge finishing materials, including flame on thermoplastic materials, but by and large the most frequently employed means is simply a motor driven cutter. Thus, as best seen in FIG. 3, there is provided a motor 38 which is suitably secured to the lower surface of the work table 12, the motor 38 supporting in driving relationship a cutting tool 40 which is mounted on a vertical axis and has cutting blades disposed on the end face of the cutting tool 40 rather than peripherally around the cutting tool body as is customary in the art. The cutting tool 40 is mounted in the motor in such a manner as to project above the surface of the bar 20 a predetermined distance, and preferably is mounted so as to be adjustable in height so that the depth of cut into the workpiece is variable. The precise manner of how this is accomplished forms no part of the present invention, and many ways of so doing will be apparent to those skilled in the art.

Figure 2:
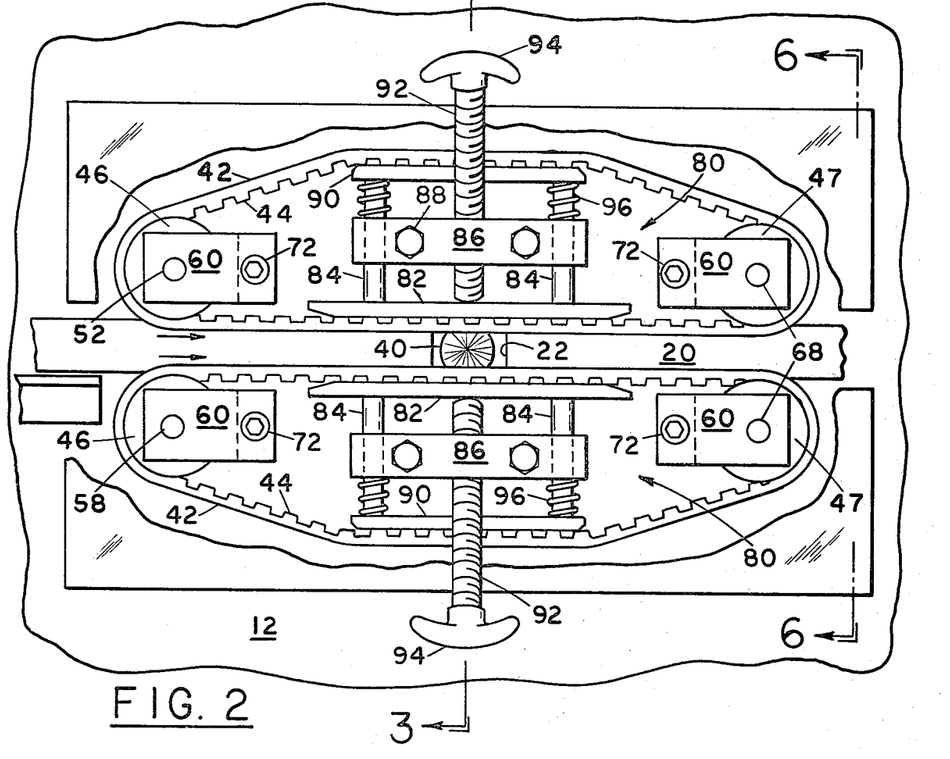
FIG. 2 is a fragmentary plan view of the details of one embodiment of the feeding assembly.

Referring now to FIGS. 2 and 3, there is seen one embodiment of a feeding assembly 18 which feeds the workpiece 16 across the length of the bar 20 and over the cutting tool 40. The feeding assembly comprises a pair of spaced apart endless belts 42 which are both configurated and mounted for movement as hereinafter described so as to grip a lower marginal portion of the workpiece on opposite surfaces thereof with sufficient force to move the workpiece across the bar 20. Each belt 42 is provided with ridges 44 in the manner of a well known timing belt, and each belt is mounted on a pair of spaced apart rollers 46 and 47, each roller having ridges corresponding to those on the belts 42, thereby providing a positive slip-free drive to the belts 42.

Figure 6:
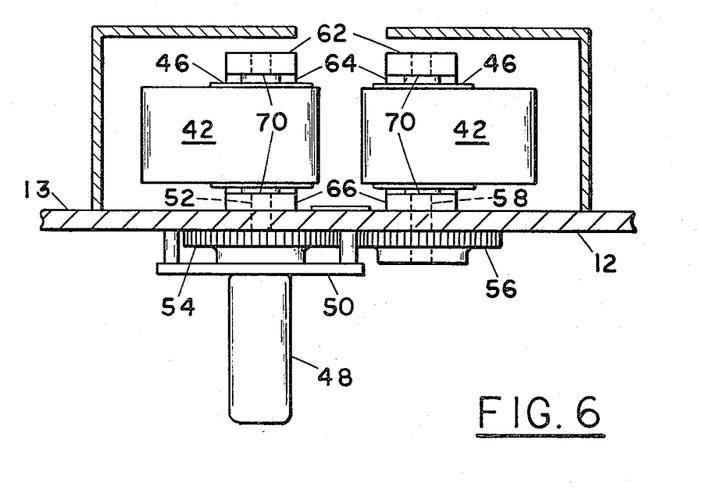
FIG. 6 is a view showing the belt drive assembly.

The belts 42 are driven in synchronism by having both belts driven from a common source of power. Thus, as best seen in FIG. 6, a motor 48 is suitably mounted on the underside of the work table 12 by means of a bracket 50, the motor preferably being a slow speed, high torque motor which is connected directly to the drive shaft 52 of one of the rollers 46, or it may be so connected by an intermediate drive gear. In either event, a gear 54 is fixed on the shaft 52 of the roller 46 just mentioned, and a corresponding gear 56 is fixed on the shaft 58 of the other roller 46 of the pair as seen in FIG. 2 with the result that the two rollers 46 are driven in synchronism. Referring to FIG. 1, it does not matter whether the two rollers 46 or the two rollers 47 are the driving rollers, with the other rollers being idlers, although in preference the rollers in the upstream direction from the work station 22 are the driving rollers for the belts 42.

The rollers 46 and 47 are mounted on the upper surface 13 of the work table 12 by means of generally C-shaped brackets 60, each bracket 60 having an upper horizontal portion 62, a side vertical portion 64 and a lower horizontal portion 66 (see FIG. 6). The shafts 52 and 58 of the rollers 46 and the corresponding shafts 68 of the rollers 47 are supported by the upper and lower horizontal portions 62 and 66 of the brackets 60 with the rollers 46 being held in proper spaced relationship therewith by spacers 70 as seen in FIG. 6. Each bracket and roller assembly is secured firmly to the work table 12 by a suitable bolt 72 (see FIG. 2) passing through a bore in the vertical portion 64 of each bracket 60 and being suitably secured to the work table 12.

Referring now to FIGS. 2 and 3 particularly, the invention includes a means for adjusting the spacing between the adjacent runs of the belts 42 so that the feeding assembly can accommodate workpieces of varying thickness and also so that the pressure with which the belts press against the surfaces of a workpiece can be varied. A pressing assembly generally indicated by the numeral 80, of which there is duplicate structure for each belt 42, comprises a backing plate 82 secured to the inner ends of a pair of rods 84 which are slidably mounted in bores passing through an elongate block 86 which is fixedly secured to the upper surface 13 of the work table 12 by a pair of bolts 88. A second backing plate 90 is secured to the other ends of the rods 84 so that the backing plates 82 and 90 move in unison with the rods 84. A threaded shaft 92 is engaged with a threaded bore in the block 86 and has a suitable handle 94 to facilitate rotation of the shaft 92. A pair of compression springs 96 are disposed on the rods 84 between the block 86 and the backing plate 90 in order to continuously maintain the backing plate 82 firmly against the end of the threaded shaft 92.

It will be seen from the foregoing that rotation of the shafts 92 in one direction will cause the adjacent backing plates 82 to move toward each other, thereby pushing the adjacent runs of the belts 42 in the same direction. This will have the effect of decreasing the space between the adjacent runs of the belts 42 to accommodate a thin sheet of material or to increase the feeding pressure of the belts on the sheet of material. As the adjacent backing plates 82 move toward each other, the rods 84 also move in the same direction and this causes the other or remote pair of packing plates 90 to move toward each other. By so doing the length of each belt 42 remains constant, since the longitudinal tension in each belt does not change as the adjacent and remote backing plates move in unison. It is essential to maintain the belts 42 at the same length regardless of the relative positions of the adjacent runs of the belts since the belts are ribbed and engage with grooved rollers, as previously mentioned, and if there were any change in the length of the belts 42 during rotation of the shafts 92, the belts would not track properly over the rollers.

Rotation of the threaded shafts 92 in the opposite direction will move the adjacent backing plates 82 away from each other by virtue of the compression springs 96 pushing against the remote backing plates 90 which in turn maintain the adjacent backing plates 82 in contact with the ends of the threaded shafts 92 as the latter are retracted. This allows either a lessening of the pressure on a workpiece by the belts 42 or either a thicker workpiece or multiple workpieces to be passed between the adjacent runs of the belts. This adjustability of the driving pressure exerted by the belts 42 is important since it has been found that too little pressure allows the workpiece to slip and not feed properly or with uniform velocity and too much pressure causes the whole system to stall because of the friction between the reverse side of the belts and the face of the adjacent backing plates.

If it is desired to remove one of the belts 42 from the supporting rollers 46 and 47, it is only necessary to loosen the bolt 72 of the non-driving roller 47 of the belt being removed and rotating the C-shaped bracket 60 holding the roller about the bolt 72 as an axis. This will introduce sufficient slack into the belt 42 that it can be readily removed from both rollers and replaced with a new belt.

Figure 4:
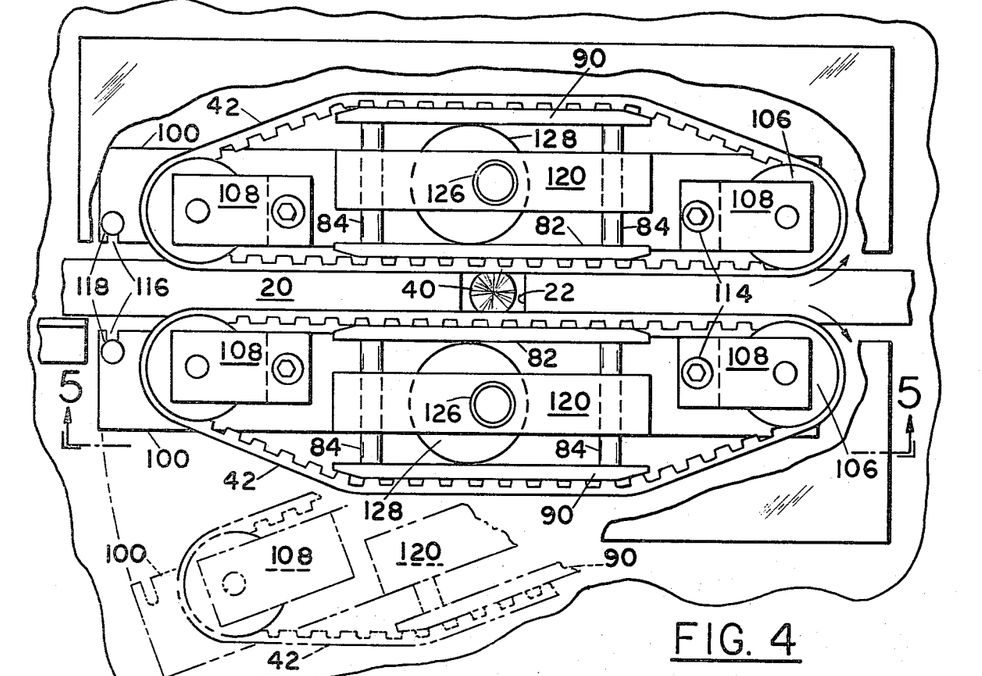
FIG. 4 is a view similar to FIG. 2 showing another embodiment of the pressing assembly and also another embodiment of mounting the feeding assembly on the machine.
Figure 5:
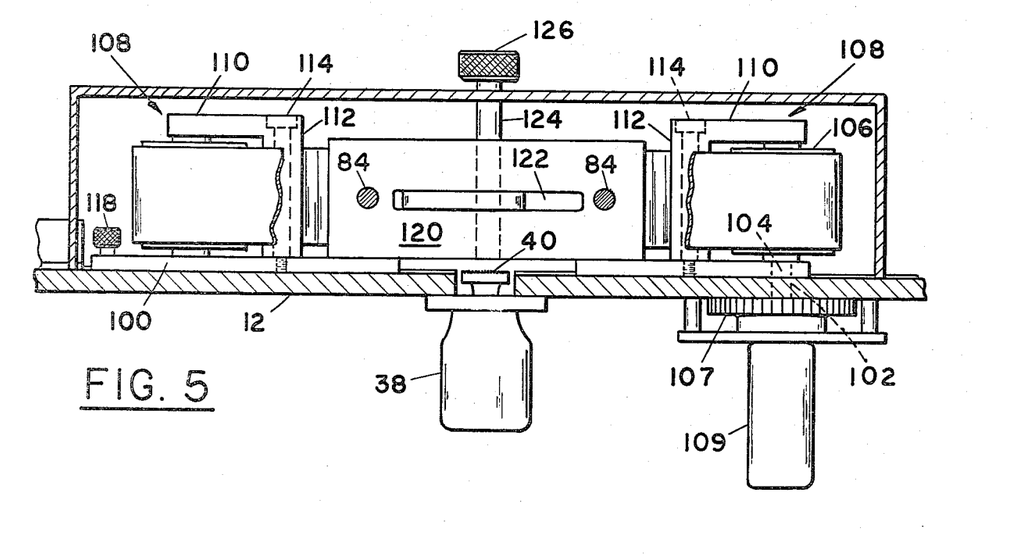
FIG. 5 is a part sectional and part side view taken on the line 5—5 of FIG. 4 showing details of the two alternative embodiments shown in FIG. 4.

Two alternative embodiments of the invention are shown in FIGS. 4 and 5, both embodiments being combined in these figures for the purpose of illustration and description, although each embodiment can be utilized independently of the other. One alternative embodiment relates to the manner in which the drive rollers and the idler rollers for the belts are mounted on the work table. The other alternative embodiment relates to the manner in which the adjacent runs of the drive belts are moved toward or away from each other to vary the spacing therebetween.

Referring to the figures and considering the first mentioned alternative embodiment, it will be seen that the four C-shaped brackets, which in the previously described embodiment were mounted directly on the surface 13 of the work table 12, are now L-shaped brackets mounted on an elongate bar which pivots about the axis of the driving rollers so that both belts can be swung away from each other without loosening the belts on the rollers in order to provide quick and convenient access to the work station 22 and particularly to the working tool 40. Thus, a pair of elongate plates 100 are placed on the surface 13 of the work table 12 and extend a little more than the distance between the pairs of rollers supporting the belts. Each plate 100 is secured to the work table 12 at both ends, but in a different manner.

At one end, each plate has a bore 102 through which the drive shaft 104 for the drive roller 106 passes, the shaft 104 being connected to the gear 107 which is driven by the motor 109 in exactly the same manner as that described above in connection with FIG. 6. Each drive roller 106 is mounted in an L-shaped bracket 108 having a horizontal leg 110 and a vertical leg 112. A bolt 114 passes through the vertical leg and is threadedly secured to the plate 100 in order to firmly secure the bracket 108 to the plate 100. The rollers 106 are otherwise mounted on the brackets 108 and the plate 100 in the same manner as the rollers previously described are mounted in the C-shaped brackets 60. Each plate 100 is provided with a recess 116 which ordinarily engages with a locking thumbscrew 118 suitably secured to the work table 12 on opposite sides of the bar 20. It will now be apparent from looking at FIG. 4 that when one or both of the locking thumbscrews 118 are loosened, one or both of the plates 100 may be moved from the full line position to the dotted line position and beyond in order to move the belts 42 away from each other to thereby completely expose the work station 22 and the cutting tool 40. As will be more apparent hereinafter, when this embodiment is utilized, the pressing assembly 80 shown in FIG. 2 or the alternative embodiment described below is also mounted on the plates 100, that is, the two bars 86 shown in FIGS. 2 and 3 would be secured to the plates 100, so that when the plates 100 are swung outwardly, the entire feeding assembly moves with the plates and remains otherwise intact. By this arrangement, quick and convenient access can be had to the work station without disturbing the belts on the feed rollers or the pressure seeting on the backing plates. If it should become necessary to change a belt in this embodiment, it is done so in the same manner as that described above in connection with the embodiment shown in FIGS. 2 and 3.

The other alternative embodiment shown in FIGS. 4 and 5 comprises a camming arrangement operated by a thumbwheel for setting the position of the pressure plates in such a manner that both the adjacent and remote pressure plates for each belt are moved in unison by rotation of a cam.

As seen in FIG. 4, a pair of adjacent backing plates 82 and a pair of remote backing plates 90 are positioned in the space between the adjacent and remote runs of the belts 42 in exactly the same manner as the corresponding backing plates shown in FIG. 2. The remote and adjacent backing plate 82 and 90 respectively are connected together by a pair of rods 84 which correspond to the rods 84 shown in FIG. 3. Because of this connection the space between the backing plates 82 and 90 of each pair will always be the same and if one backing plate moves, so must the other. The rods 84 pass through bores in a pair of blocks 120 which are similar to the blocks 86 shown in FIG. 3 except that the blocks 120 are secured to the table 12 by means of a conventional slot and screw arrangement (not shown) since there is no room to provide bolts as with the blocks 86.

Each block 120 is provided with a slot 122 approximately midway between the top and bottom of the block 120 although this location is not critical. A shaft 124 extends through the block 120 from a location beneath the slot 122 and terminates upwardly in a suitable thumbwheel 126 by which the shaft 124 can easily be rotated. A cam 128 is fixedly mounted on the shaft 124 for rotation with the shaft, the cam in the embodiment illustrated being simply a circular disc which is mounted eccentrically on the shaft 124. It will be understood from the foregoing that when either of the shafts 124 are rotated by the thumbwheel 126, the corresponding cam 128 will also be rotated and this will cause the backing plates 82 and 90 associated with that cam to move toward or away from the work station 22 depending upon the direction of rotation of the shafts 124. As with the previous embodiment shown in FIG. 3, it is possible to move either one or both of the pairs of backing plates 82 and 90 in order to either change the spacing between the adjacent runs of the belts 42 or to change the cutting alignment of a workpiece with the cutting tool or both.

As best seen in FIG. 1, a two piece cover 130 and 132 is conveniently mounted on the table 12 in such a manner that it substantially encloses the entire feeding assembly 18. The spacing between the two sections of the cover is sufficient to accommodate the widest sheet which the machine is designed to accommodate. The cover confines the dust and debris from the cutting tool to the area within the cover.

We claim:

1. A material working machine for edge finishing of workpieces of varying size and of various materials, said machine comprising:
   A. a work table having a flat work surface over which a workpiece is adapted to be fed,
   B. an aperture in said work table which defines a work station in the path of movement of the workpiece,
   C. a working tool disposed in said aperture and positioned therein in appropriate relation to the bottom edge of the workpiece to perform a working operation on said edge of the workpiece as the latter passes over said aperture,
   D. means mounted beneath said work table for supporting and operating said working tool, and
   E. a feeding assembly mounted on said work table for feeding a workpiece in operative association with said working tool, said feeding assembly comprising
      1. a pair of opposed resilient gripping elements for forcibly pressing against opposite surfaces of the workpiece with sufficient pressure to hold the workpiece in feeding relationship, said resilient gripping elements comprising a pair of endless flexible belts, 2. means mounting said gripping elements for movement along a predetermined path of movement at least a portion of which traverses said working station, said means mounting said gripping elements comprising a plurality of rollers for each belt, the rollers for each belt being configurated and spaced so as to define a pair of adjacent runs which are juxtaposed to and run along said work station and a pair of remote runs which are spaced from said adjacent runs,
3. means disposed in the space between said adjacent runs and said remote runs for adjusting the space between said pair of adjacent runs of said belts, said means for adjusting the space between said adjacent runs of said belts comprising means for simultaneously moving the adjacent run and the remote run of each of said belts toward and away from said work station by the same amount of movement, said means for simultaneously moving the adjacent run and the remote run of each of said belts toward and away from said working station by the same amount of movement comprising
   a. a block secured to said work table in the space between said adjacent and said remote runs of said belts,
   b. a pair of rods movably mounted in said block,
   c. a first backing plate secured to one end of said rods for movement therewith,
   d. a second backing plate secured to the other end of said rods for movement therewith,
   e. a cam mounted for rotation in said block between said first and second backing plates and being of a size to contact both backing plates, and
   f. means for rotating said cam
whereby said cam causes movement of said first and second backing plates toward and away from said work station and thereby maintains the overall length of the belt constant.

2. A material working machine for edge finishing of workpieces of varying size and of various materials, said machine comprising:
   A. a work table having an elongate flat work surface over which a workpiece is adapted to be fed and which thereby supports the weight of the workpiece,
   B. an aperture in said work table at an intermediate location along said work surface which defines a work station in the path of movement of the workpiece,
   C. a working tool disposed in said aperture and mounted for rotation about a vertical axis and positioned therein in such manner that the upper working face of said working tool projects above said flat work surface so as to contact the bottom edge of the workpiece to perform a working operation on said edge of the workpiece as the latter passes over said aperture,
   D. means mounted beneath said work table for supporting and operating said working tool, and
   E. a feeding assembly mounted on said work table and extending along said elongate work surface for a substantial distance both in advance of and beyond said aperture for feeding a workpiece in a vertical plane in operative association with said working tool, said feeding assembly comprising
      1. a pair of opposed resilient gripping elements for forcibly pressing against opposite surfaces of the workpiece with sufficient pressure to hold the workpiece in reeding relationship, said resilient gripping elements comprising a pair of endless flexible belts mounted on said work table, said belts having a pair of opposed adjacent runs disposed in juxtaposition with said working station for gripping and feeding a workpiece across said work station, said belts having remote runs,
      2. means mounting said gripping elements for movement along a predetermined path of movement at least a portion of which traverses said working station, said means mounting said gripping elements as aforesaid comprising a pair of rollers for each belt, one roller of each pair being mounted on said work table in the upstream direction relative to said work station at a substantial distance from said work station and the other roller being mounted on said work table in the downstream direction relative to said work station at a substantial distance from said work station whereby said adjacent runs of said belts traverse said work station and extend therebeyond in both directions for said substantial distance in said feeding relationship for feeding a workpiece thereacross, each of said rollers being mounted on said work table by means of generally L-shaped brackets mounted adjacent each end of a pair of elongate plates mounted on said work table, one plate associated with eqch belt, and means removably securing said L-shaped bracket to said plates, whereby at least one roller of each of said pairs of rollers is removable from the plate associated therewith in order to be able to remove the belt associated with said roller, said belts normally being maintained under tension by the space between said pair of rollers supporting the belt associated therewith, and
      3. means for moving said gripping elements in unison and at a uniform velocity
   whereby a workpiece held by said gripping elements is moved over said work station so that the lower edge thereof is finished by said working tool.

3. A machine according to claim 2 wherein one roller of each of said pairs of rollers is mounted on a drive shaft journaled for rotation in said work table, and each of said plates is pivotally connected at one end to one of said drive shafts and is releasably locked at the other end to said work table thereby permitting said plates to separate relative to each other while maintaining the spacing between each of said pairs of rollers thereby permitting access to said working tool without changing the tension on said belts.

* * * * *